United States Patent [19]
Yamazaki et al.

[11] Patent Number: 5,243,856
[45] Date of Patent: Sep. 14, 1993

[54] PARKING BRAKE OPERATING DEVICE

[75] Inventors: Hiroshi Yamazaki, Yokohama; Katsushige Nakamura, Fujisawa; Kyoichi Ishida, Yamato, all of Japan

[73] Assignee: Ohi Seisakusho Co., Ltd., Yokohama, Japan

[21] Appl. No.: 925,388

[22] Filed: Aug. 4, 1992

[30] Foreign Application Priority Data

Aug. 9, 1991 [JP] Japan .............. 3-070654[U]

[51] Int. Cl.⁵ .................................. G05G 5/18
[52] U.S. Cl. ............................ 74/538; 74/535; 74/537
[58] Field of Search .............. 74/335, 336, 337, 338

[56] References Cited

U.S. PATENT DOCUMENTS

| | | | |
|---|---|---|---|
| 4,212,211 | 7/1980 | Rickert | 74/538 |
| 4,864,886 | 9/1989 | Burgei | 74/535 X |
| 4,881,424 | 11/1989 | Clark et al. | 74/535 X |
| 5,001,942 | 3/1991 | Boyer | 74/538 X |
| 5,067,366 | 11/1991 | Gandiglio | 74/538 X |

FOREIGN PATENT DOCUMENTS

| | | | |
|---|---|---|---|
| 457461 | 11/1991 | European Pat. Off. | 74/538 |
| 61-218460 | 9/1986 | Japan . | |
| 1-120464 | 8/1989 | Japan . | |
| 2-274645 | 11/1990 | Japan | 74/538 |
| 3-110973 | 11/1991 | Japan . | |
| 3-125660 | 12/1991 | Japan . | |

*Primary Examiner*—Rodney H. Bonck
*Assistant Examiner*—Ryan W. Massey
*Attorney, Agent, or Firm*—Zarley, McKee, Thomte, Voorhees, & Sease

[57] ABSTRACT

In a parking brake operating device for a motor vehicle, an operating lever and an intermediate lever are pivotally mounted around a transverse common shaft. The intermediate lever is pivotally mounted to a locking lever at its upper part. The locking lever is engaged with an engaging pin of the operating lever. A release lever is pivotally mounted at an upper part of the operating lever and is engaged with the locking lever in a locking position. By pressing an operating portion of the release lever manually, the release lever is disengaged from the locking lever, which is, then, disengaged from the engaging pin of the operating lever. Thus, the operating lever can easily be brought down by one hand of a driver while the parking brake is applied, and the inside of the motor vehicle is effectively utilized without keeping the operating lever upright.

6 Claims, 5 Drawing Sheets

PARKING BRAKE OPERATING DEVICE

BACKGROUND OF THE INVENTION

The present invention relates to a parking brake operating device for a motor vehicle in which an operating lever falls down from a brake-operating position to a non-operating position, while a parking brake is kept operative.

There is a known device, for example, in Japanese Patent Laid-Open Pub. No.61-218460 in which a slider mounted to a base of an operating lever slides forwardly, whereby a setting member integrally connected with the slider is disengaged from an engaging portion of an intermediate lever, so that only the operating lever falls down forwardly with respect to the intermediate lever for keeping braking operative. In the device, the operating lever can be brought down during braking, so that the inside of a car is not obstructed. However, when the operating lever is brought down during braking in the device, one hand of a driver grasps a grip of the operating lever, while the slider must be moved by the other hand forwardly. It requires two hands and involves troublesome operation. By pressing down the slider while moving forwardly by one hand, the operating lever can be brought down, but one-hand operation is very difficult since the slider is provided on the base of the operating lever. In the device, when the slider is moved, the setting member rubs against the engaging portion of the intermediate lever. Also, if the slider is not held by the other hand when the operating lever is rotated under braking, the end of the setting member slidably abuts an arcuate guide portion of the intermediate lever, which results in poor durability owing to wear. Further, in the device, the slider and the push button for releasing braking of the parking brake are independently operative. Accordingly, when the slider is operated such that only the operating lever is brought down under braking, it is liable to release braking in error if the push button is mistakenly pressed.

One-hand operating device, for example, in Japanese Utility Model Laid-Open Pub. No.1-120464 comprises an operating lever elastically engaged with an intermediate lever merely by holding force of a spring, so that the operating lever has a poor stability and is liable to fall down only by softly touching the operating lever. If the holding force of the spring is strengthened, there is another problem which is difficulty in rotation of the operating lever.

SUMMARY OF THE INVENTION

In view of the above disadvantages in the known art, an object of the present invention is to provide a parking brake operating device easily operable by one hand without slidably abutting portion for rotating an operating lever during braking, thereby increasing durability without possibility of mistaken operation.

According to the present invention, there is a parking brake operating device which comprises a base plate; an operating lever pivotally mounted to the base plate around a transverse shaft and having an engaging pin; an intermediate lever pivotally mounted to the base plate around the transverse shaft; a locking lever pivotally mounted to the intermediate lever and having a hook portion which is engageable with the engaging pin of the operating lever in a locking position for connecting the operating lever to the intermediate lever; a release lever pivotally mounted to the operating lever and engaged with the locking lever in the locking position, the release lever being rotated to disengage from the locking lever in an unlocking position and having a blocking portion for preventing a pushing button from being pushed in the unlocking position, the button being retractably provided at an end of the operating lever, the operating lever having holding means for holding the release lever in the unlocking position.

From a parking-brake operating position where the operating and intermediate levers are both operative, the release lever is rotated to the unlocking position, so that the hook portion is disengaged from the engaging pin. Then, the release lever is brought down, and the release lever remote from the intermediate lever rotates with the operating lever without slidably abutting the intermediate lever.

The following advantages could be attained by the present invention.

a) The release lever in the unlocking position is held by holding means, whereby after the release lever is rotated by one hand to the unlocking position, the operating lever can be brought down by the hand, thereby making two-hand operation unnecessary and increasing operational efficiency.

b) When the operating lever is brought up and down during braking, the release lever and other members do not slidably abut the intermediate lever and other parts, thereby providing small-force rotation of the operating lever and improving durability by avoiding wear.

c) When the release lever is disposed in the unlocking position, the blocking portion thereof prevents the push button from being pushed, thereby avoiding erroneous operation such as mistaken releasing of braking.

BRIEF DESCRIPTION OF THE DRAWINGS

The above and other objects and advantages of the present invention become more apparent to persons skilled in the art from the following description of preferred embodiments with respect to appended drawings wherein.

PREFERRED EMBODIMENTS OF THE INVENTION

Figure 1:
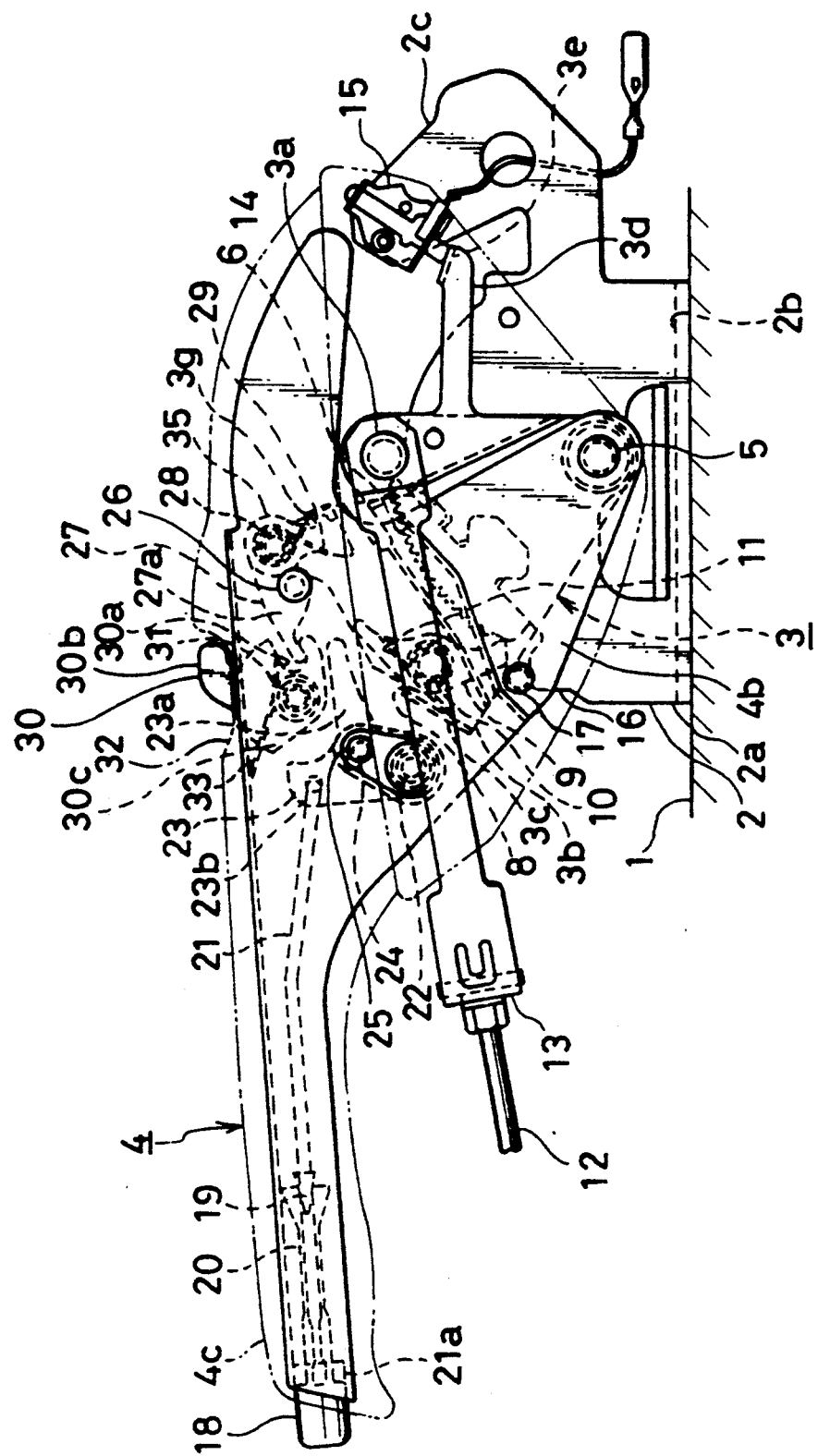
FIG. 1 is a side elevational view of one embodiment of the present invention in which an operating lever and an intermediate lever are in a non-operating position.
Figure 2:
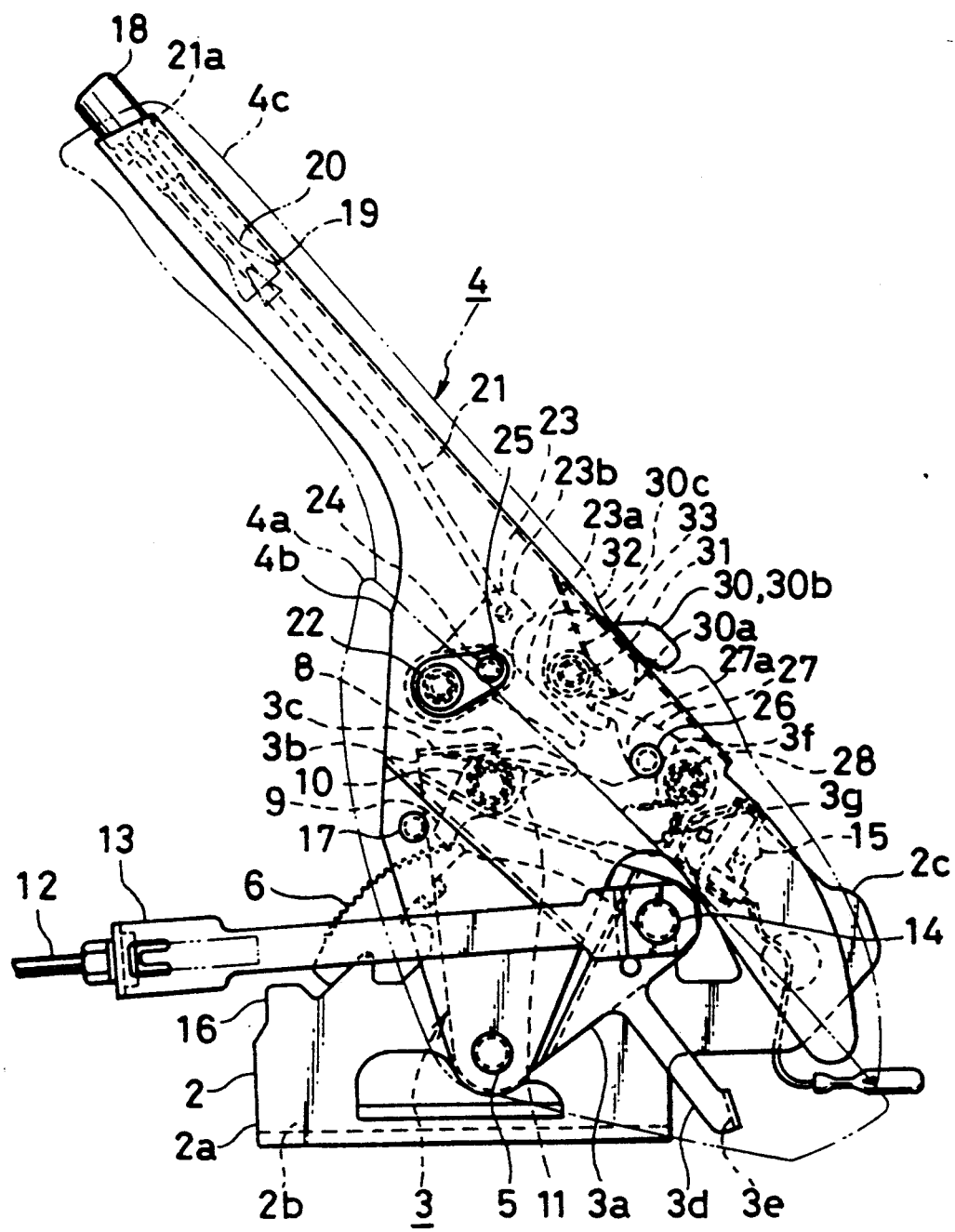
FIG. 2 is a side elevational view in which the operating and intermediate levers are rotated in an operating position for braking.
Figure 3:
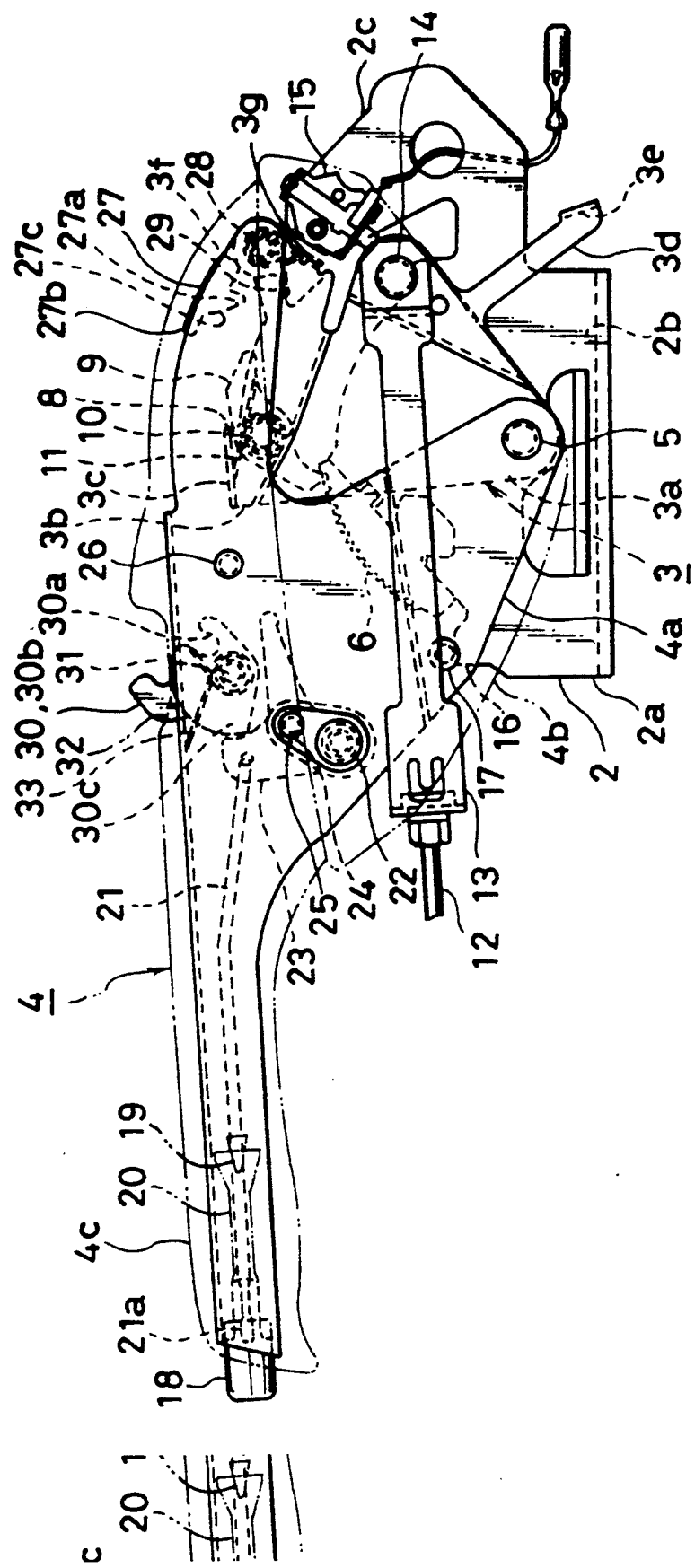
FIG. 3 is a side elevational view in which only the operating lever is rotated again to the non-operating position.

Referring to FIGS. 1 to 3, a parking brake operating device will be described as a whole, and thereafter the features according to the present invention will be described in detail.

The numeral 1 denotes a floor panel in a car, and the numeral 2 denotes a base plate which comprises a base portion 2a which stands on the floor panel 1, and a mounting portion 2b at the lower end of the base portion 2a. At the intermediate lower portion of the base portion 2a of the base plate 2, side portions 3a of an inversely U-sectioned over the base portion 2a and side portions 4a of an inversely U-sectioned operating lever 4 over the intermediate lever 3 are pivotally mounted around a transverse common shaft 5. Arcuate ratchet teeth 5 are fixed on the upper edge of the base plate 2. The side portions 3a of the intermediate lever 3 are fan-shaped around the shaft 5, and a pair of somewhat wider radial extensions 3b is provided on the outer periphery of the front half of the side portions 3a. The outer peripheries of the extensions 3b are connected to each other by the side portions 3c. A rectangular notch 8 is formed on the middle of the connecting portion 3c and the outer periphery of the extensions 3b.

Between the extensions 3b of the intermediate lever 3, a pawl 9 engagable with the ratchet teeth 6 is pivotally mounted around a transverse shaft 10. The numeral 11 denotes a torsion coil spring for normally biasing the pawl 9 for engagement with the ratchet teeth 6. The torsion coil spring 11 is wound around the shaft 10, one end being engaged with the lower edge of the connecting portion 3c, the other end being engaged with the rear lower edge of the pawl 9. Between the rear ends of the side portions 3a of the intermediate lever 3, the rear end of a metal fitting 13 is connected with a shaft 14, the metal fitting 13 being fixed to the end of a cable 12 which extends in a rearward and upward direction from the floor panel 1.

The cable 12 is connected to a parking brake (not shown). By pulling the cable 12 in a rearward and upward direction, the brake is actuated, and by releasing it, the brake is released. At the rear part of one of the side portions 3a of the intermediate lever 3, there is provided an arm 3d which comprises an actuating portion 3e. When the intermediate lever 3 is located in a non-operating position where the pawl 9 is engaged with the front edge of the ratchet teeth 6 as shown in FIG. 1, the actuating portion 3e abuts a parking brake switch 15 fixed to a support portion 2c which extends in a rearward and upward direction from the rear end of the base portion 2a of the base plate 2. Thus, by opening a contact of the switch 15, a parking brake indicator lamp (not shown) on an instrument board turns off, and the intermediate lever 3 rotates in a clockwise direction in FIG. 1 from the non-operating position to pull the cable 12, while, when the brake is actuated, the actuating portion 3e is disengaged from the parking brake switch 15, thereby closing the contact of the switch 15 and allowing the parking brake indicator lamp to turn on.

The operating lever 4 is covered with a synthetic resin cover 4b and a cylindrical handle 4c is formed at the front end thereof.

Between the side portions 4a of the operating lever 4, there is provided an engaging pin 17 which abuts the front lower edges of the side portions 3a of the intermediate lever 3 and rotates the intermediate lever 3 in a direction for pulling the cable 12 when the operating lever 4 rotates in a standing direction, i.e. in a clockwise direction in FIG. 2.

When the operating lever 4 falls down in a non-operating direction as shown in FIG. 1, the engaging pin 17 is engaged with a stopper 16 at the front upper edge of the base portion 2a of the base plate 2, thereby preventing the operating lever 4 from further rotating downwardly. A push button 18 is retractably engaged with the front end of the handle 4c. Between the rear end of the push button 18 and a projection 19 in the handle 4c of the operating lever 4, there is provided a compression spring 20 by which the push button 18 is usually biased to project forwardly. A male thread 21a at the front end of a connecting rod 21 through the compression spring 20 is engaged with the rear end of the push button 18. The rear end of the connecting rod 21 is connected to the upper part of an unlocking lever 23 which is pivotted around the shaft 22 between the side portions 4a of the operating lever 4.

The unlocking lever 23 comprises an arm 23a, the end of which confronts the upper end of the pawl 9 through the notch 8 of the intermediate lever 3 when the engaging pin 17 abuts a front lower edge of the intermediate lever 3.

The numeral 24 denotes an arcuate bore through the unlocking lever 23, and 25 denotes a pin which projects on the operating lever 4 to extend through the bore 24, so that the unlocking lever 23 may rotate around the shaft 22 within the range that the pin 25 is movable in the bore 24.

By pushing the push button 18, the arm 23a presses the upper end of the pawl 9 through the notch 8 of the intermediate lever 3, thereby disengaging the pawl 9 from the ratchet teeth 6 and placing the unlocking lever 23 in an unlocking position (not shown) where the pawl 9 engages with the lower end of the notch 8. When the push button 18 projects forwardly, the pin 25 abuts the front edge of the bore 24 by biasing force of the coil spring 20, and the unlocking lever 23 is placed under a normal position (in FIG. 1) in which the end of the arm 23a is disengaged from the pawl 9 forwardly.

The present invention provides the features based on the addition of the following structure.

As shown in FIGS. 4 to 7, there is provided an engaging pin 26 at the upper portion between the side portions 4a of the operating lever 4. A locking lever 27 is pivotally mounted around a shaft 28 to a bearing 3f which extends from the upper rear end of the intermediate lever 3. The locking lever 27 comprises a hook portion 27a which is engaged with the pin 26 for connecting the operating lever 4 with the intermediate lever 3; a projection 27b which extends forwardly from the hook portion 27a; an inclined surface 27c which extends between the projection 27b and the hook portion 27a; and a stopper portion 27d at the lower portion.

The numeral 29 denotes a torsion coil spring which is wound around a shaft 28 for biasing the locking lever 27 in an anticlockwise direction where the hook portion 27a is engaged with the engaging pin 26. By biasing force of the torsion spring 29, the locking lever 27 usually stops by allowing the stopper portion 27d to abut a stopper 3g which projects from the bearing 3f of the intermediate lever 3.

Between the side portions 4a of the operating lever 4, a release lever 30 is pivotally mounted around a shaft 31. There is provided a groove 30a which is engaged with the projection of the locking lever 27 at the rear upper edge of the release lever 30 when the operating lever 4 is connected to the intermediate lever 3. At the upper portion of the release lever 30, there is formed an operating portion 30b which projects upwardly through an opening 32 at the upper surface of the operating lever 4.

Figure 4:
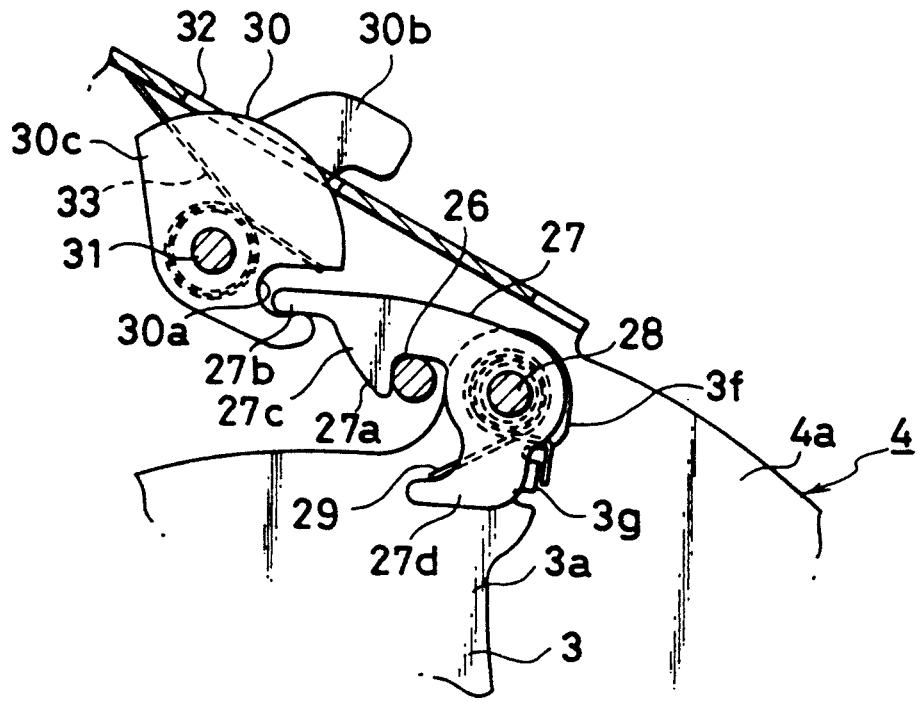
FIG. 4 is an enlarged sectional view of the main part in FIG. 2.
Figure 5:
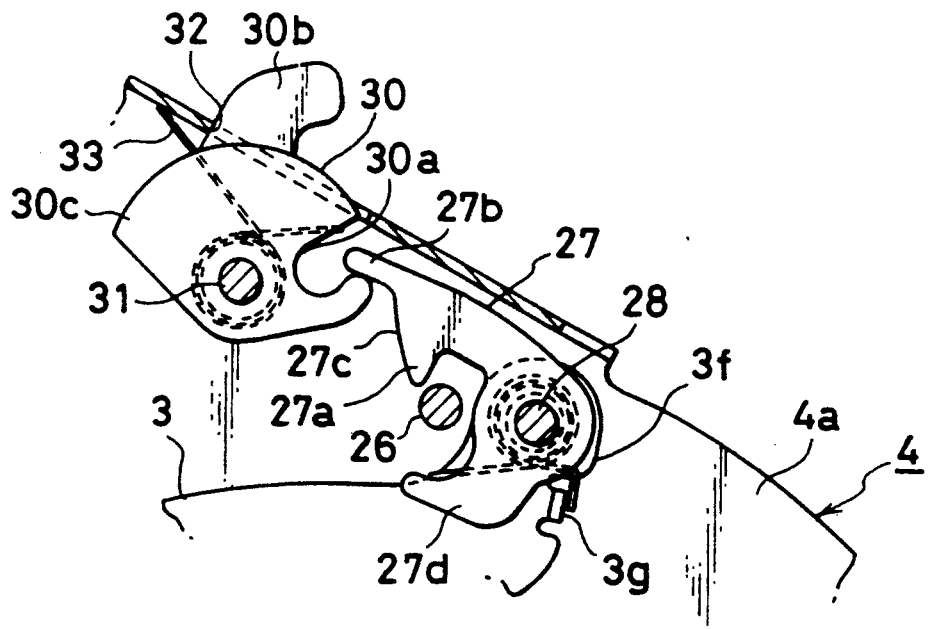
FIG. 5 is a sectional view which illustrates that the release lever is rotated to a unlocking position from FIG. 4 and is similar to FIG. 4.
Figure 6:
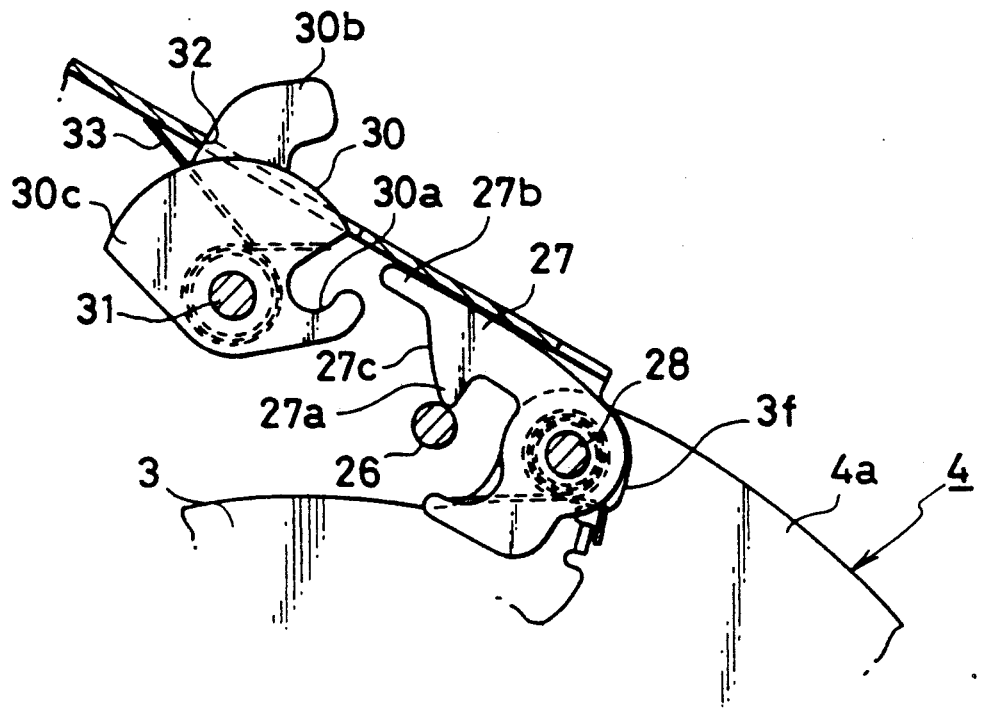
FIG. 6 is a sectional view which illustrates that the operating lever is slightly rotated in a forward direction from FIG. 5 and is similar to FIG. 4.
Figure 7:
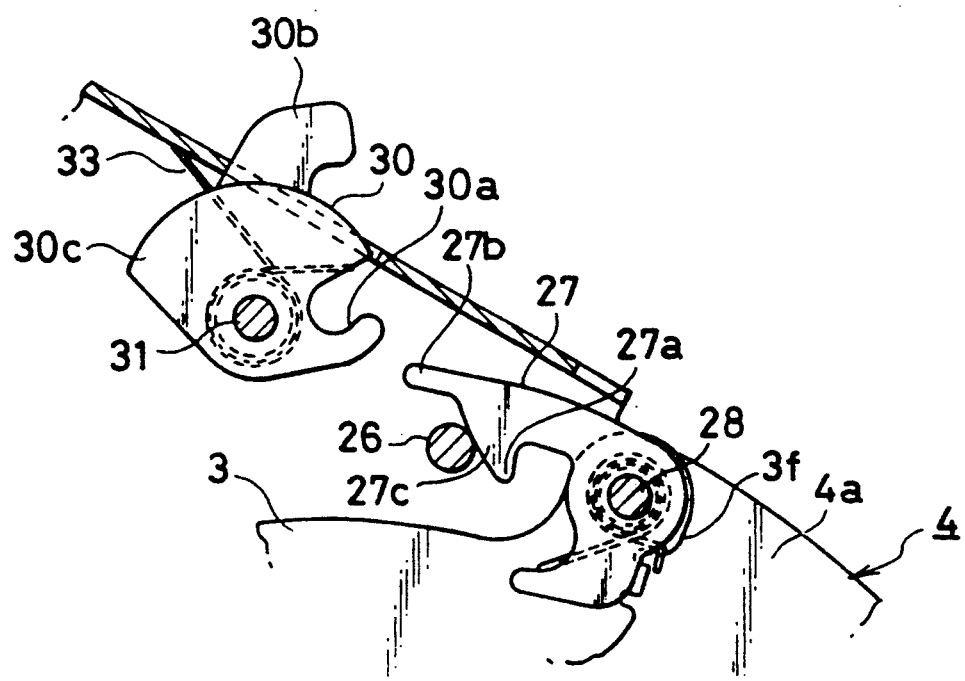
FIG. 7 is a sectional view which illustrates that the operating lever is further somewhat rotated in a forward direction from FIG. 6 and is similar to FIG. 4.

The release lever 30 is biased in an anticlockwise direction by a low spring-constant torsion spring 33 (holding means) wound around the shaft 33 and is usually located in an unlocking position as shown in FIGS. 5 to 7 where the operating portion 30b abuts the front edge of the opening 32. When the hook portion 27a of the locking lever 27 is engaged with the engaging pin 26 as shown in FIG. 4, the release lever 30 is located by the projection 27b in a locking position where the lower edge of the groove 30a goes down.

At the front corner of the release lever 30, there is formed a blocking portion 30c for abutting the rear edge of the projection 23b of the unlocking lever 23 to prevent the push button 18 from being pressed when the release lever 30 is located in the unlocking position.

The functions of the embodiments will be hereinafter described.

When the operating and intermediate levers 4 and 3 are located in the non-operating position in FIG. 1, the hook portion 27a of the locking lever 27 is engaged with the engaging pin 26 and the release lever 30 is disposed in the locking position. When the operating lever 4 is rotated in a standing direction, the engaging pin 17 pushes the intermediate lever 3, which is rotated in the same direction, whereby the cable 12 is pulled to actuate the brake and the pawl 9 pivotted to the intermediate lever 3 advances on the ratchet teeth 6 one by one. When the actuating portion 3e is disengaged from the parking brake indicator switch 15 with the rotation of the intermediate lever 3, the switch closes and the parking brake indicator lamp turns on. When the operating lever 4 stops in the standing position as shown in FIG. 2, it meshes with the ratchet teeth 6, thereby preventing the intermediate lever 3 from returning to the original position and keeping the cable in pulling condition. If the push button 18 is not operated, it is kept in projecting position by biasing force of the coil spring 20 and the unlocking lever 23 is disposed in a normal position.

During braking, the operating lever 4 may be kept in the standing position, but may fall down to the original non-operating position if the upright operating lever through the seat cushion is a hindrance.

Firstly, the release lever 30 is manually rotated from the locking position in FIG. 4 to the unlocking position in FIGS. 5 to 7. As shown in FIG. 5, the projection 27b of the locking lever 27 is pressed up by the release lever 30 and the hook portion 27a is disengaged from the engaging pin 26. Thereafter, the operating lever 4 is brought down forwardly, and, then, the hook portion 27a passes over the engaging pin 26 as shown in FIGS. 5 to 7, while the release lever 30 is kept in the unlocking position by biasing force of the torsion spring 33. The release lever 30 is spaced apart from the intermediate lever 3, and the operating lever 4 may be rotated by small force without engaging the release lever 30 with the intermediate lever 3 slidably during rotation of the operating lever 4.

The release lever 30 is kept in the unlocking position by biasing force of the torsion coil spring 33, while the blocking portion 30c of the release lever 30 confronts the rear edge of the projection 23b of the unlocking lever 23, thereby preventing the push button 18 from being pushed and avoiding mistaken operations that the push button 18 is pushed in error during falling of the operating lever 4 to release braking and that pushing of the push button 18 is mistakenly recognized to have been unlocked though braking is not actually released. That is to say, it can be found that the operating lever 4 has been brought down during braking since the push button 18 cannot be pushed in spite of intention of pushing.

As shown in FIG. 3, the operating lever 4 can be brought down during braking, so that the inside of a car can be effectively utilized without standing lever 4.

To release braking, then, the operating lever 4 is rotated upwardly to the original standing position. According to an operation contrary to the above, as shown in FIG. 7, the engaging pin 26 slidably abuts the inclined surface 27c of the locking lever 27, which is rotated against biasing force of the coil spring 29 in a clockwise direction in FIG. 7. After the hook portion 27a passes over the engaging pin 26 as shown in FIG. 6, the release lever 30 is rotated in a clockwise direction to return from the unlocking position to the locking position in FIG. 4 while the projection 27b is engaged with the groove 30a of the release lever 30. Thus, the release lever 30 and the locking lever 27 are returned to the original locking position in FIG. 4. Biasing force of the torsion coil spring 29 may be preferably larger than that of the torsion coil spring 33.

When the release lever 30 is returned to the locking position, the blocking portion 30c gets upwardly off a rotation track of the projection 23b of the release lever 23, thereby enabling the push button 18 to be pushed. Then, by pushing the push button 18 in, the unlocking lever 23 is rotated to the unlocking position in which the pawl is pressed by the end of the arm 23a, so that the pawl 9 is disengaged from the ratchet teeth 6. Rotating the operating lever 4 to the non-operating position in FIG. 1 while the push button 18 is pushed, the locking lever 27 is engaged with the engaging pin 26, so that the intermediate lever 3 is rotated together with the operating lever 4 such that it is placed between the engaging pin 17 and the arm 23a of the unlocking lever 23, and braking is released by loosening the cable 12. With the returning rotation of the intermediate lever 3, the operating portion abuts the parking brake switch 15, so that the parking brake indicator lamp turns off by opening the contact. Accordingly, by making sure that the parking brake indicator lamp turns off, it could be found that the brake is not effective. Thereafter, when a hand leaves the push button 18, the pawl 18 is engaged with the front end of the ratchet teeth 6 and returns to the position in FIG. 1.

The foregoing merely relates preferred embodiments of the invention, and any changes and modifications may be made by persons skilled in the art without departing from the scope of appended claims wherein:

What is claimed is:

1. A parking brake operating device which comprises:

a base plate;

an operating lever pivotally mounted to the base plate around a transverse shaft and having an engaging pin;

an intermediate lever pivotally mounted to the base plate around the transverse shaft;

a locking lever pivotally mounted to the intermediate lever and having a hook portion which is engageable with the engaging pin of the operating lever in a locking position for connecting the operating lever to the intermediate lever:

a release lever pivotally mounted to the operating lever and engaged with the locking lever in the locking position, the release lever being rotated to disengage from the locking lever in an unlocking position and having a blocking portion for preventing a pushing button from being pushed in the unlocking position, the button being retractably provided at an end of the operating lever, the operating lever having holding means for holding the release lever in the unlocking position.

2. A parking brake operating device as defined in claim 1 wherein the holding means comprises a torsion coil spring which is wound around a shaft of the release lever.

3. A parking brake operating device as defined in claim 2 wherein the locking lever is pivotally mounted around a shaft to the intermediate lever by a torsion coil spring wound around the shaft of the locking lever, biasing force of the torsion coil spring for the locking lever being larger than that of the torsion coil spring for the release lever, whereby the release lever is engaged with the locking lever in the locking position.

4. A parking brake operating device as defined in claim 1 wherein the release lever comprises an operating portion at its upper part, the operating portion projecting upwardly through an opening at an upper surface of the operating lever and being manually rotated so as to disengage the locking lever from the engaging pin.

5. A parking brake operating device as defined in claim 4 wherein the release lever has a groove, while the locking lever has a projection which is engageable with the groove of the release lever in the locking position.

6. A parking brake operating device as defined in claim 5 wherein an inclined surface extends between the projection and the hook portion of the locking lever, the engaging pin of the operating lever being slidably moved on the inclined surface so that the engaging pin may be easily disengaged from the hook portion of the locking lever when the operating portion of the release lever is manually pressed.

* * * * *